United States Patent [19]

Onuki et al.

[11] Patent Number: 4,881,099
[45] Date of Patent: Nov. 14, 1989

[54] READER PRINTER AND IMAGE RECORDING APPARATUS

[75] Inventors: Kazuhiko Onuki, Tokyo; Masami Maetani, Ageo, both of Japan

[73] Assignee: Canon Kabushiki Kaisha, Tokyo, Japan

[21] Appl. No.: 220,245

[22] Filed: Jul. 18, 1988

[30] Foreign Application Priority Data

Jul. 31, 1987 [JP] Japan ................. 62-190430
Dec. 28, 1987 [JP] Japan ................. 62-329664

[51] Int. Cl.⁴ ............................................. G03B 13/28
[52] U.S. Cl. ........................................ 355/45; 355/66
[58] Field of Search .............. 355/45, 57, 60, 65, 355/66, 51

[56] References Cited

U.S. PATENT DOCUMENTS

| | | | |
|---|---|---|---|
| 4,589,767 | 5/1986 | Yanagi et al. | 355/45 |
| 4,636,059 | 1/1987 | Thompson | 355/45 X |
| 4,708,463 | 11/1987 | Kondoh et al. | 355/45 |
| 4,751,553 | 6/1988 | Fukasawa | 355/45 |
| 4,800,413 | 1/1989 | Ito et al. | 355/45 |

FOREIGN PATENT DOCUMENTS 84260 5/1984 Japan .

Primary Examiner—Richard A. Wintercorn
Attorney, Agent, or Firm—Fitzpatrick, Cella, Harper & Scinto

[57] ABSTRACT

An image recording apparatus which is arranged to project image rays from an image bearing medium onto a screen by the mirrors of a reader system and, as required, to record the image on an image recording medium by rotating a rotary mirror in a scanning manner. The apparatus includes a plurality of reflection mirrors for transmitting image rays reflected by the rotary mirror onto the image recording medium. The mirrors are disposed such that the optical axes of the image rays reflected from the rotary mirror to the final-stage mirror are located in one plane.

13 Claims, 8 Drawing Sheets

READER PRINTER AND IMAGE RECORDING APPARATUS

BACKGROUND OF THE INVENTION

1. Field of the Invention

The present invention relates generally to an image recording apparatus and, more particularly, to an image recording apparatus such as a reader printer for projecting an image from an image bearing medium such as a microfilm onto a screen and for recording the projected image on an image recording medium.

2. Description of the Prior Art

Referring to FIG. 4 which illustrates a diagrammatically conventional type of image recording apparatus, a rotary mirror 202 is dispose in the vicinity of a projection lens 201 for projecting an image on a microfilm 200 on an enlarged scale, and the rotary mirror 202 is rotated in a scanning manner, thereby effecting projection and recording of the image.

When an image on the microfilm 200 is to be projected onto a screen 203, the reflection plane of the rotary mirror 202 is tilted slightly upwardly as viewed in FIG. 4, and image rays from the microfilm 200 are projected onto the screen 203 by mirrors 204 and 205 disposed at locations generally above the rotary mirror 202.

Recording of an image of the microfilm 200 is effected in the following manner. The rotary mirror 202 is rotated in the direction indicated by an arrow A for scanning movement, and the image rays are projected by mirrors 206 and 207 onto a photosensitive drum 208 as it rotates in the direction indicated by an arrow B in synchronization with the rotation of the rotary mirror 202. In consequence, the image of the microfilm 200 is projected onto the photosensitive drum 208 in a slit-like form and thus a corresponding electrostatic latent image is formed on the photosensitive drum 208. Thereafter, the electrostatic latent image is recorded on an image recording medium, for example, recording paper by a known electrophotographic process.

However, such a prior art arrangement involves the following problems. As shown in FIG. 4, the optical axis of the image rays is not horizontally formed between the rotary mirror 202 and the mirror 206 nor between the mirror 206 and the mirror 207 which is located vertically above the photosensitive drum 208. During assembly of the apparatus, therefore, it is difficult to accurately position the respective mirrors 206 and 207 in predetermined locations, and an error easily occurs in the angle of inclination of each of the mirrors 206 and 207. As a result, the optical axes of the image rays may deviate, and thus it would be impossible to select a desired region of an image to be recorded. Also, a printed image of uniform density may not be obtained due to uneven illumination.

In addition, since the optical axes of the reflected rays is not horizontal, the prior art apparatus requires a vertically expanded space for accommodating the mirrors 206 and 207 and, therefore, involves the problem of an inevitable increase in the size of the apparatus.

As is known, reader printers of this type include two major sections. One section is an image forming section whose constituent elements includes a reader optical system, a printer optical system, and a photosensitive member with associated components disposed around it such as a development unit and a cleaner. The other section is a sheet feeding section for feeding sheets of recording paper. These sections include a multiplicity of members which are combined in a complicated arrangement. Therefore, even if a cover is detachably arranged at one side of the apparatus, it is difficult to smoothly perform checking and maintenance when necessary, such as removal of any sheet which becomes jammed in a sheet feeding path or cleaning of the above-described sections.

To solve these problems, it has been proposed to provide a reader printer which includes a body constituted by an upper assembly and a lower assembly, the upper and lower assemblies being pivotally joined at one side thereof by means of a hinge, with one of the assemblies accommodating image forming means such as a photosensitive member, a development unit and an electrostatic charger can be opened and closed.

However, the assembly of such prior art apparatus includes, in addition to the image forming means, further includes other components which are arranged in a densely packed space, for example, a scanning mechanism and an optical system such as a mirror for scanning image rays. It is therefore still difficult to smoothly perform checking and maintenance of the image forming section.

SUMMARY OF THE INVENTION

It is therefore an object of the present invention to provide an image recording apparatus capable of recording a high-quality image without involving any deviation of the optical axes of image rays.

It is another object of the present invention to provide an image recording apparatus which has a reduced size and which can be easily assembled and adjusted.

It is still another object of the present invention to provide an image recording apparatus which is arranged to allow an upper assembly to be easily opened and closed so that the maintenance of an image forming section in the vicinity of a photosensitive member is facilitated.

According to one aspect of the invention, there is provided an image recording apparatus which comprises a projection lens and first, second and third reflection means. The first reflection means is rotatably disposed for reflecting light rays transmitted through the projection lens. The second reflection means is arranged to transmit light rays reflected from the first reflection means onto an image display section. The third reflection means is arranged to transmit light rays reflected from the first reflection means onto an image recording section. The third reflection means also includes a plurality of mirrors arranged to reflect light from said first reflection means successively from mirror to mirror and then to the image recording section. The plurality of mirrors is further arranged such that the optical axes of light rays reflected by each of the mirrors are located in substantially the same plane.

According to another aspect of the invention, there is provided a reader printer which is arranged to project an image from a film onto a screen and, as required, to project the image onto a photosensitive member. The reader printer of this embodiment comprises first, second and third assemblies. The first assembly includes a projection lens and a rotary mirror. The second assembly includes a plurality of mirrors arranged to transmit light rays reflected by the rotary mirror onto the screen and the photosensitive member. The second assembly is supported on the first assembly to swing between closed and open positions. The third assembly includes the photosensitive member as well as processing means arranged to cooperate with the photosensitive member to record and reproduce images projected onto the photosensitive member. The third assembly is rotatably supported on the first assembly and is detachable from the first assembly when the second assembly is placed in its open position.

According to a still further aspect of the invention, there is provided in a plurality of reflection mirrors an image recording apparatus which projects image rays from an image bearing medium onto a screen by the mirrors of the reader system and, as required, to record the image on an image recording medium by rotating a rotary mirror in a scanning manner. The reflection mirrors are arranged to transmit image rays reflected by the rotary mirror successively from mirror to mirror and then onto the image recording medium; and the mirrors are disposed such that the optical axes of the image rays reflected from the rotary mirror to the last of the reflection mirrors are located in the same plane.

In one embodiment of the present invention there is provided an image recording apparatus which is arranged to project an image from an image bearing medium onto a screen by the mirrors of a reader system and, as required, to record the image on an image recording medium by rotating a rotary mirror in a scanning manner. The image recording apparatus includes a plurality of reflection mirrors for transmitting image rays reflected by the rotary mirror successively from mirror to mirror and then onto the image recording medium, the mirrors being disposed such that the optical axes of the light rays reflected from the rotary mirror to the final-stage mirror may be located in the same plane.

In accordance with the present invention, the optical axes of image rays from the rotary mirror to the last of the reflection mirrors are located in the same plane. Accordingly, it is possible to easily position the reflection mirrors when mounting them and to minimize any error in the angle of inclination of each of the reflection mirrors and, in addition, the space required for accommodating the reflection mirrors can be minimized.

Another embodiment of the present invention comprises an upper assembly and a lower assembly which are swingably and detachably joined together, the upper assembly including a screen, a reader optical system and a printer optical system, the lower assembly including a projection lens, a rotary scanning mirror, an image forming section and a sheet feeding section, the image forming section being disposed for swinging movement with respect to the sheet feeding section.

BRIEF DESCRIPTION OF THE DRAWINGS

A better understanding of the present invention may be gained from the following detailed description when read in connection with the accompanying drawings, in which.

DESCRIPTION OF THE PREFERRED EMBODIMENTS

Figure 1:
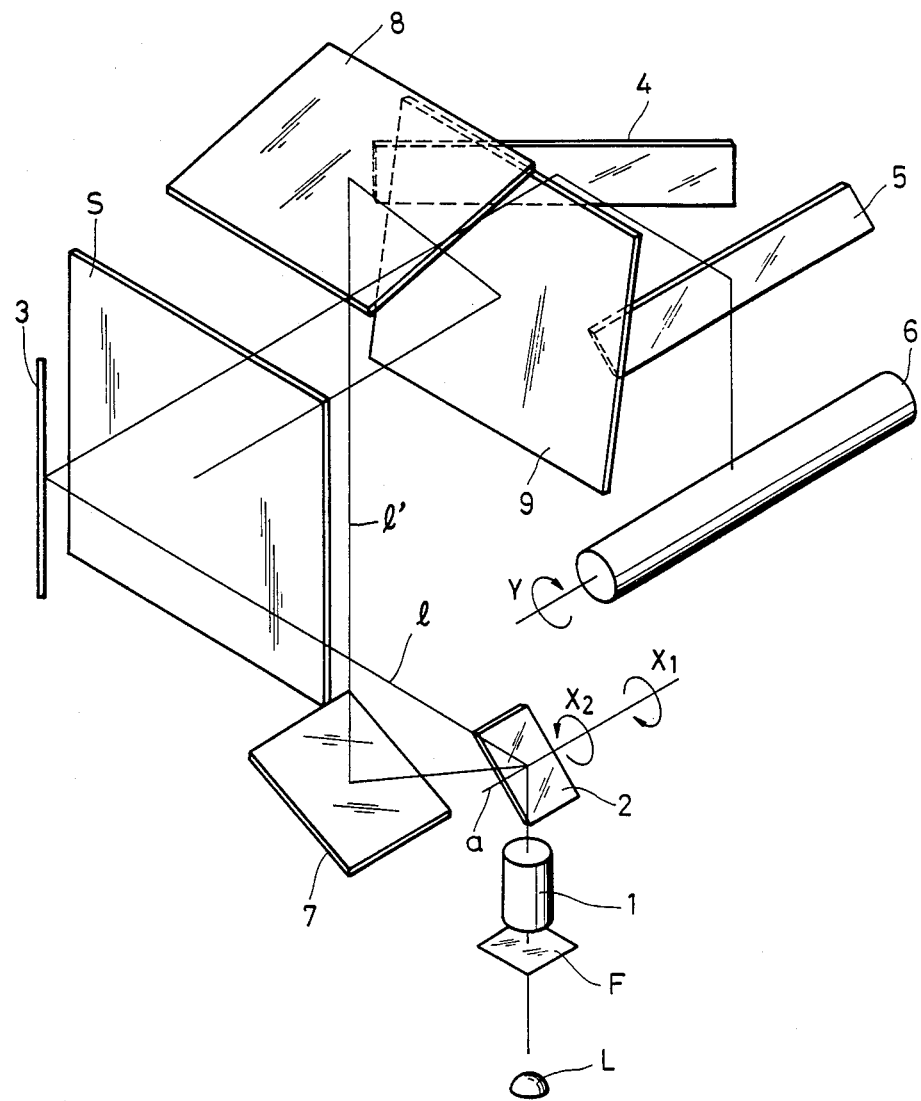
FIG. 1 is a diagrammatic perspective view showing the optical arrangement of a first preferred embodiment of an image recording apparatus in accordance with the present invention.

Preferred embodiments of the present invention will be described below with reference to the accompanying drawings wherein like parts are identified by like reference numerals.

FIG. 1 is a diagrammatic perspective view of the optical arrangement of a first embodiment of an image recording apparatus in accordance with the present invention. As illustrated, a microfilm F is used as an image bearing medium, and an illumination lamp L is disposed below the microfilm F. A projection lens 1 for projecting an image from the microfilm F on an enlarged scale is disposed above the microfilm F. A rotary mirror 2 is disposed to effect switchover between a printer optical system and a reader optical system, and is adapted to rotate for scanning movement during recording of an image. The rotary mirror 2 is connected to a mirror driving means (not shown). Stationary mirrors 3, 4 and 5 are disposed as reflection mirrors for transmitting image rays reflected by the rotary mirror 2 onto a photosensitive drum 6 which serves as an image recording medium. The stationary mirrors 3, 4 and 5 are disposed at a height that corresponds to the position of the rotary mirror 2 so that the optical axes l of the image rays reflected by the rotary mirror 2 and the stationary mirrors 3 and 4 are maintained in the same horizontal plane.

Stationary mirrors 7, 8 and 9 constitute the reader optical system for transmitting image rays onto a screen S. The stationary mirror 7 is disposed generally below the rotary mirror 2, and the stationary mirror 8 is disposed vertically above the stationary mirror 7. An optical axis l' passes between the stationary mirrors 7 and 8.

Figure 2:
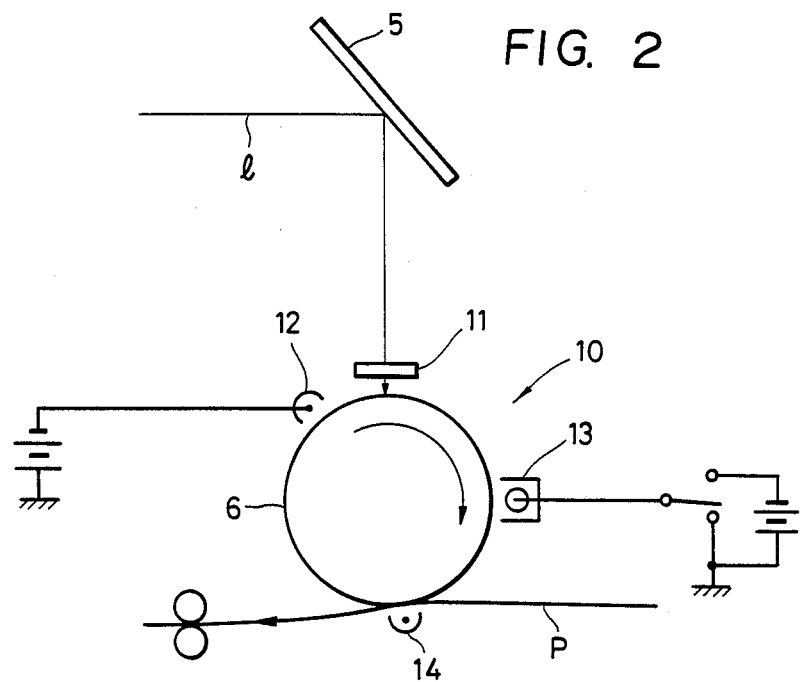
FIG. 2 is a side elevational view showing in diagrammatic form the construction of the image forming means used in the first embodiment.

As shown in FIG. 2, an image forming means 10 employing a known electrophotographic process is disposed around the photosensitive drum 6. More specifically, the image forming means 10 includes a shutter base 11 disposed above the photosensitive drum 6 and having a slit (not shown) which extends parallel to the axis of rotation of the photosensitive drum 6, a primary electrostatic charger 12 for electrostatically charging the surface of the photosensitive drum 6, a development device 13 for developing an electrostatic latent image formed on the photosensitive drum 6, a transfer charger 14 for transferring the developed image onto a transfer material P, and the like.

The image recording apparatus having the above-described arrangement performs projection and recording of an image from the microfilm F in the following manner.

A desired image on the microfilm F that is illuminated by an illumination lamp L is projected by the projection lens 1 onto the rotary mirror 2 on an enlarged scale. The projected image is reflected by the rotary mirror 2.

During the projection of the image, the reflection plane of the rotary mirror 2 is tilted slightly downwardly. Therefore, the image rays are reflected to the stationary mirrors 7, 8 and 9 and from there projected onto the screen S.

When image recording is to be performed, the rotary mirror 2 is rotated about its rotation axis a in the direction indicated by an arrow $X_1$ until the reflection plane of the rotary mirror 2 is tilted upwardly by an angle greater than 45° with respect to the horizontal. After being placed in this position, the rotary mirror 2 is rotated in the direction indicated by an arrow $X_2$, and the photosensitive drum 6 is rotated in synchronization with the rotation indicated by the arrow $X_2$ Accordingly, the rotary mirror 2 and the photosensitive drum 6 are rotated in synchronization with each other, and the image rays from the microfilm F are projected onto the photosensitive drum 6 by the stationary mirrors 3, 4 and 5. Thus, a corresponding electrostatic latent image is formed on the photosensitive drum 6.

Figure 4:
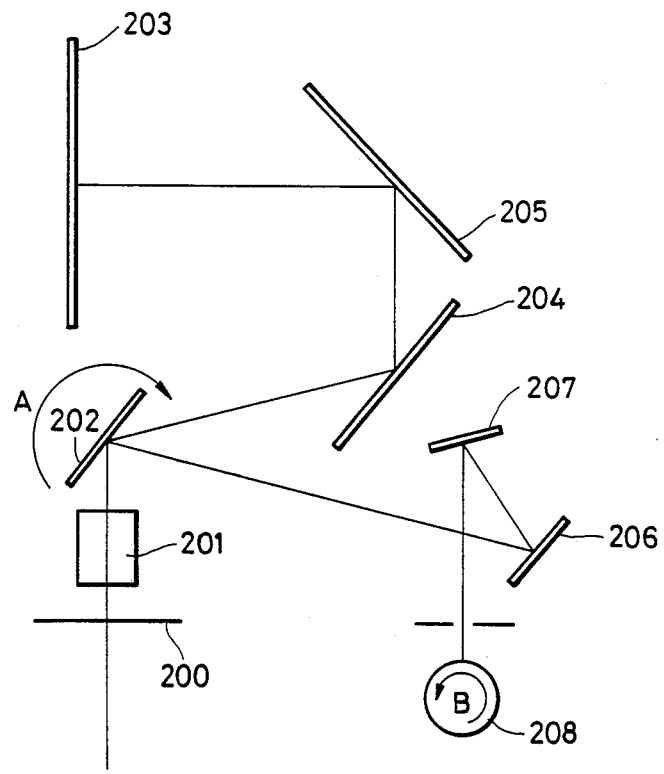
FIG. 4 is a schematic side elevational view showing the optical arrangement of a prior art image recording apparatus.

As illustrated in FIG. 1, the stationary mirrors 3, 4 and 5 are supported at the same height, that is, on an identical support plate (not shown) so that the optical axes 1 of light rays reflected from the rotation axis a of the rotary mirror 2 via the stationary mirror 4 to the stationary mirror 5 may be located in a horizontal plane, that is, in the same plane. Therefore, in the first embodiment, it is possible to dispose the above-described stationary mirrors 3, 4 and 5 with high precision with respect to a horizontal reference plane as compared with the prior art apparatus of FIG. 4 in which the printer-system mirrors are disposed at a height different from that of the reader-system mirrors. Accordingly, since the optical axis of the image rays is maintained at minimal deviation from horizontal, it is possible to record a high-quality image.

The stationary mirrors 3, 4 and 5 are disposed at a height that corresponds to that of the rotary mirror 2. Accordingly, no vertically expanded space is needed and therefore the size of the apparatus can be reduced.

As illustrated, in the first embodiment, the stationary mirror 7 of the reader optical system is disposed below the optical axes of the above-described rays of an image to be printed and on the side of the projection lens 1 that commonly accommodates no component. Also, the stationary mirror 8 is disposed vertically above the mirror 1. Therefore, the mirrors 7 and 8 are disposed in such a manner that the optical axes 1' of the rays of an image to be printed pass between the mirrors 7 and 8. Accordingly, this arrangement enables the position of the screen S to be shifted downwardly; and it is thus possible to project a more visible image onto the screen S a hence to provide a compact apparatus having a reduced height.

Figure 3:
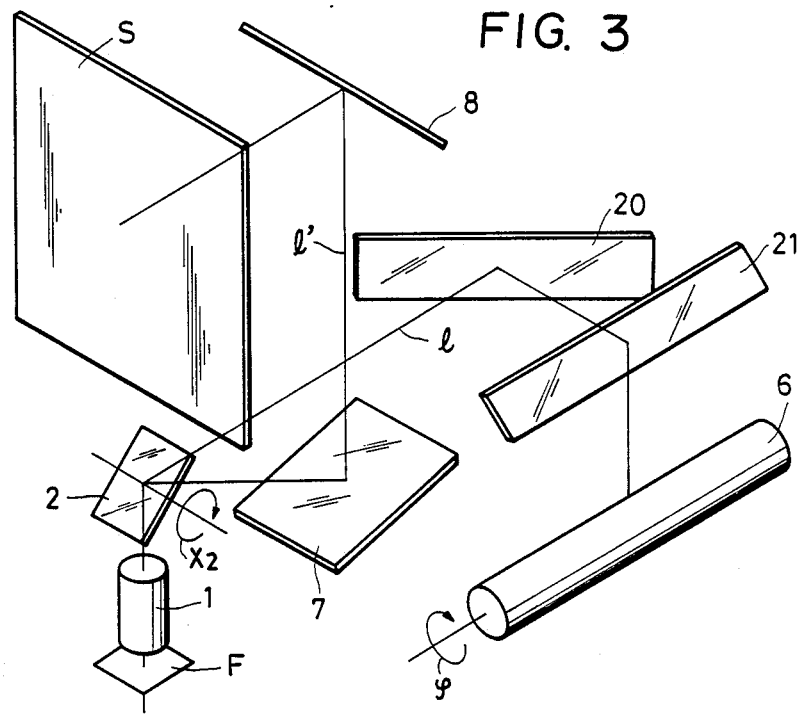
FIG. 3 is a diagrammatic perspective view showing the optical arrangement of a second preferred embodiment of an image recording apparatus in accordance with the present invention.

Referring to FIG. 3 which shows a second embodiment of an image recording apparatus according to the present invention, the optical system of the printer system in this embodiment is constituted by three mirrors.

At the time of image projection, similarly to the first embodiment, an image on the microfilm F is enlarged by the projection lens 1, and is projected onto the screen S by the rotary mirror 2 and the stationary mirrors 7 and 8.

At the time of image recording, the photosensitive drum 6 is rotated in the direction indicated by an arrow $y_2$ in synchronization with the rotation of the rotary mirror 2 in the direction of the arrow $X_2$, and the photosensitive drum 6 is exposed to image rays reflected by the rotary mirror 2 as well as mirrors 20 and 21. Thereafter, the image on the microfilm F is recorded on the surface of the photosensitive drum 6 by a known electrophotographic process.

In the second embodiment as well, the mirrors 20 and 21 are disposed so that the optical axes 1 of the image rays which extend from the rotation axis of the rotary mirror 2 to the mirror 20 and then to the mirror 21, may be located in a horizontal plane. Also, the stationary mirrors 7 and 8 are disposed so that the optical axes 1 of the rays of an image to be printed may pass between the mirrors 7 and 8. It is therefore possible to provide effects similar to those of the first embodiment. In addition, in the second embodiment, the image rays reflected by the stationary mirror 7 are transmitted onto the screen S by the mirrors 7 and 8, while the same image rays are transmitted onto the photosensitive drum 6 by the mirrors 20 and 21. Accordingly, it is possible to further reduce the size of the apparatus and the cost of manufacture thereof.

As described above, in the first and second embodiments, the reflection mirrors are disposed so that the optical axes from the rotary mirror to the final-stage reflection mirror may be located in one plane. Therefore, it is possible to minimize any error in the angle of inclination of each of the reflection mirrors and hence to greatly reduce the deviation of the optical axes of the image rays, whereby a high-quality image can be recorded.

In addition, since the reflection mirrors 20 and 21 are disposed so that the optical axes 1 of the light rays from the mirrors 2 and 20 are located in the same plane, a vertically expanded space for these mirrors is not needed and therefore the size of the apparatus can be reduced. If the reader-system mirrors are disposed in such a compact space, it is possible to provide a compact image recording apparatus having a reduced height.

FIGS. 5 to 10 show a reader printer according to a third embodiment of the present invention.

Figure 8:
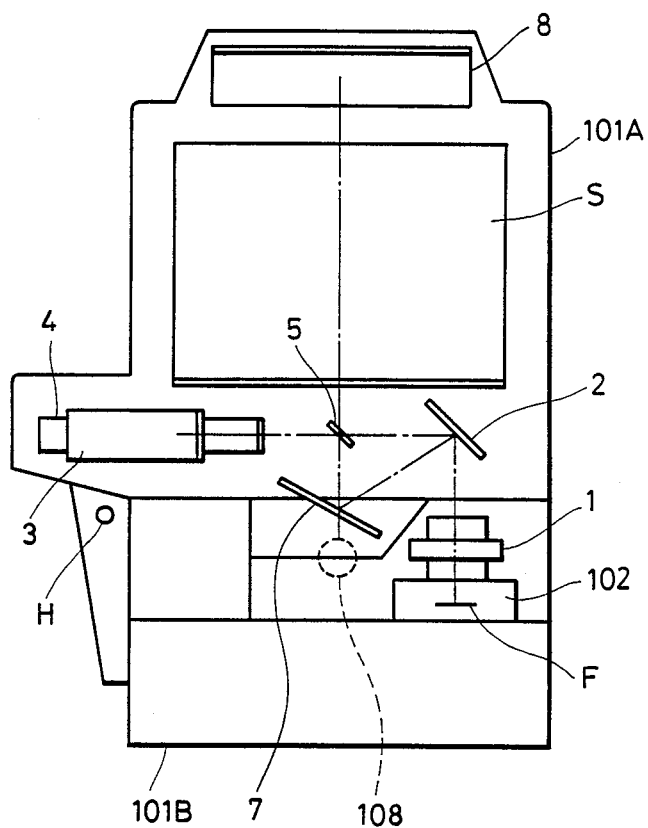
FIG. 8 is a schematic front elevational view of the optical arrangement of the third embodiment when the upper assembly is in its closed position.
Figure 9:
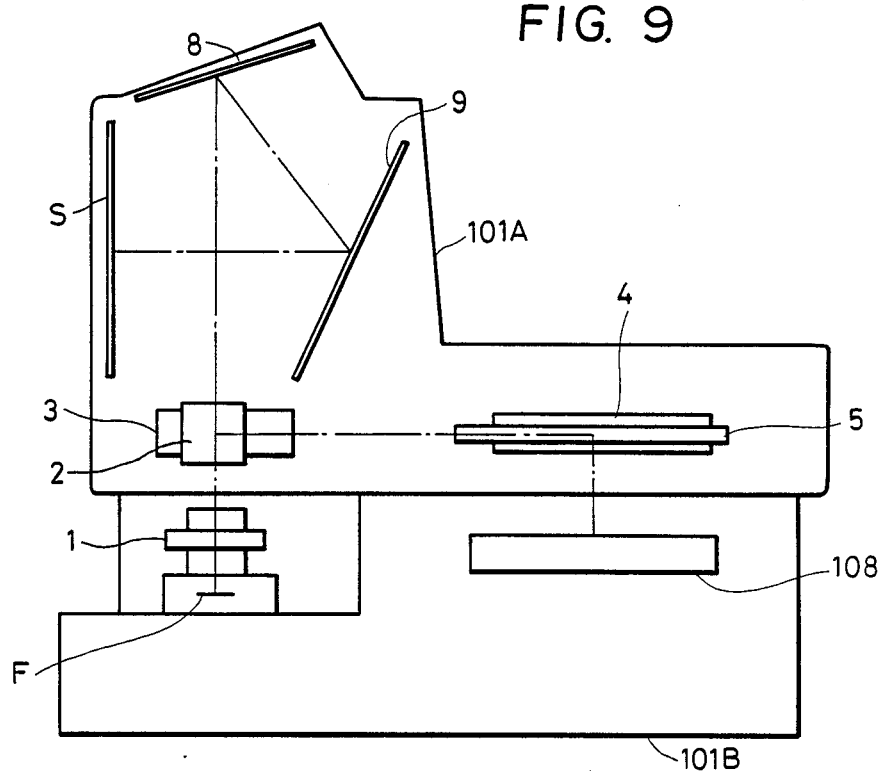
FIG. 9 is a schematic side elevational view, taken from the right-hand side, of the optical arrangement of the third embodiment.
Figure 10:
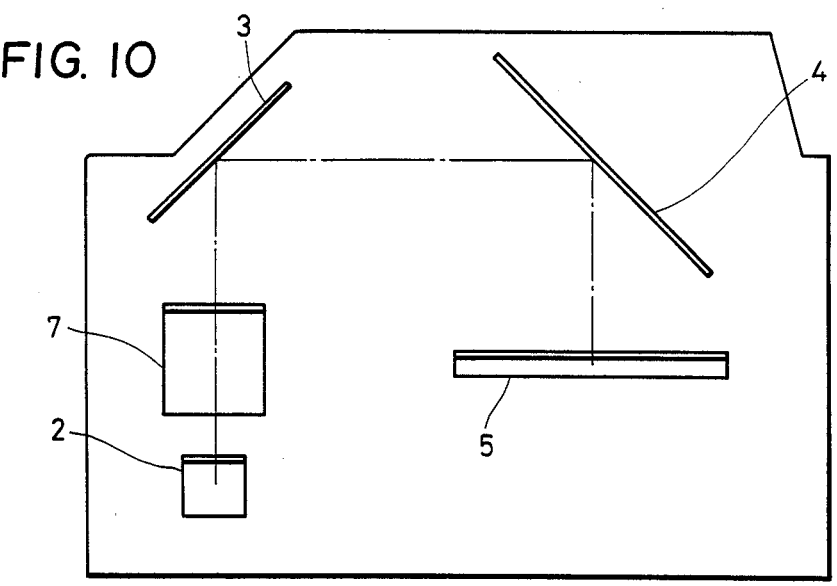
FIG. 10 is a schematic plan view of the optical arrangement of a printer optical system in the third embodiment.

FIGS. 8 to 10 show the optical system of the reader printer to which the third embodiment is applied. FIG. 8 is a diagrammatic front elevational view of the reader and printer optical systems used in the third embodiment, FIG. 9 is a diagrammatic side elevational view taken from the right-hand side, of the third embodiment, and FIG. 10 is a diagrammatic plane view of the printer optical system in the third embodiment.

Figure 5:
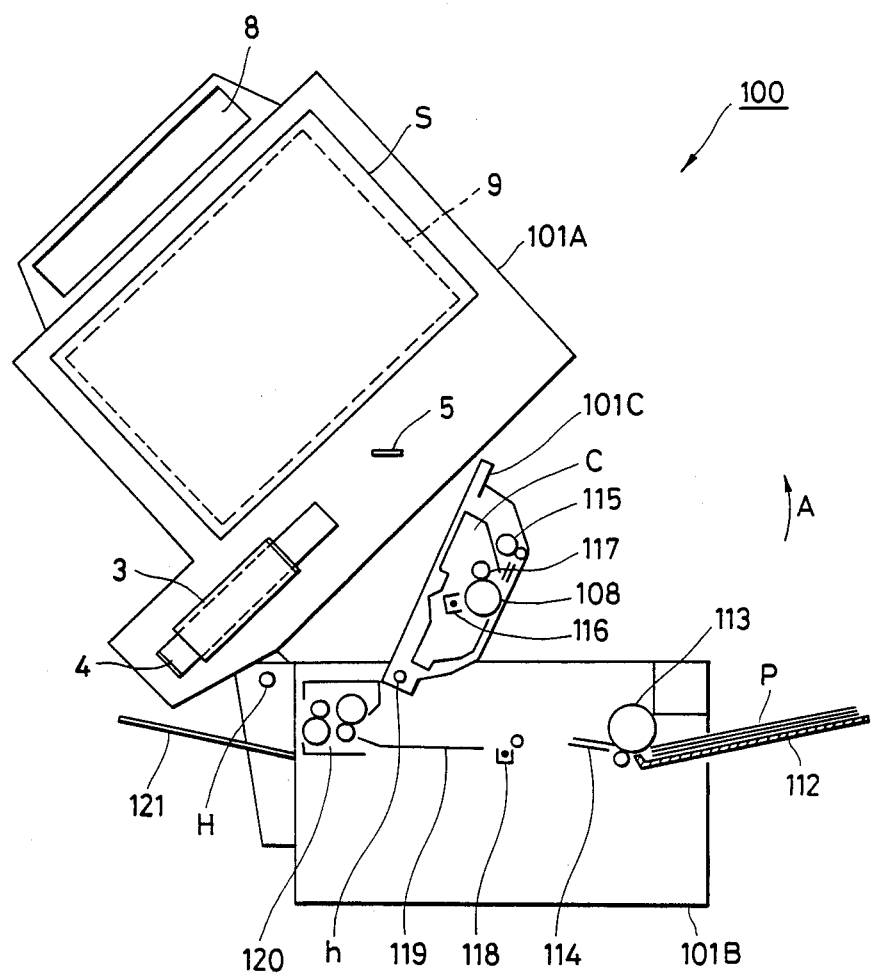
FIG. 5 is a front elevational view showing in diagrammatic form the construction of a third preferred embodiment of an image recording apparatus in accordance with the present invention, and illustrates the optical arrangement of an upper assembly and a cross-sectional view of the construction of a lower assembly when the upper assembly and a middle assembly are in their open positions.

A reader printer indicated generally at 100 in FIG. 5 comprises an upper assembly 101A and a lower assembly 101B. The upper assembly 101A and the lower assembly 101B are swingably and detachably joined together by a hinge H.

As shown in FIG. 8, the lower assembly 101B includes a film carrier 102 which accommodates the microfilm F as an image bearing medium on which images have been recorded.

As shown in FIGS. 9 and 10, the upper assembly 101A includes a rotary mirror 2 for reflecting in a scanning manner image rays projected by the projection lens 1, the second mirror 3, the third mirror 4 and the fourth mirror 5. The mirrors 3, 4 and 5 constitute a printer optical system, and the rotary mirror 2 and the mirrors 3, 4 and 5 are disposed in a horizontal plane as illustrated in FIG. 9.

A photosensitive drum 108 receives image rays transmitted by the fourth mirror 5, and the corresponding latent image is formed on the surface of the photosensitive drum 108. It is to be noted that a slit means and a shutter (neither of which is shown) for slit-like exposure are arranged between the fourth mirror 5 and the photosensitive drum 108. The exposure of the photosensitive drum 108 is controlled by controlling the operation of the shutter.

The second mirror 7 (FIG. 10) and the third and fourth mirrors 8 and 9 (FIG. 9) constitute the reader optical system. The third mirror 8 and the fourth mirror 9 are disposed in the upper assembly 101A. Image rays from the microfilm F are transmitted onto the screen S by the reader optical system, and the image is displayed on the screen S.

Figure 6:
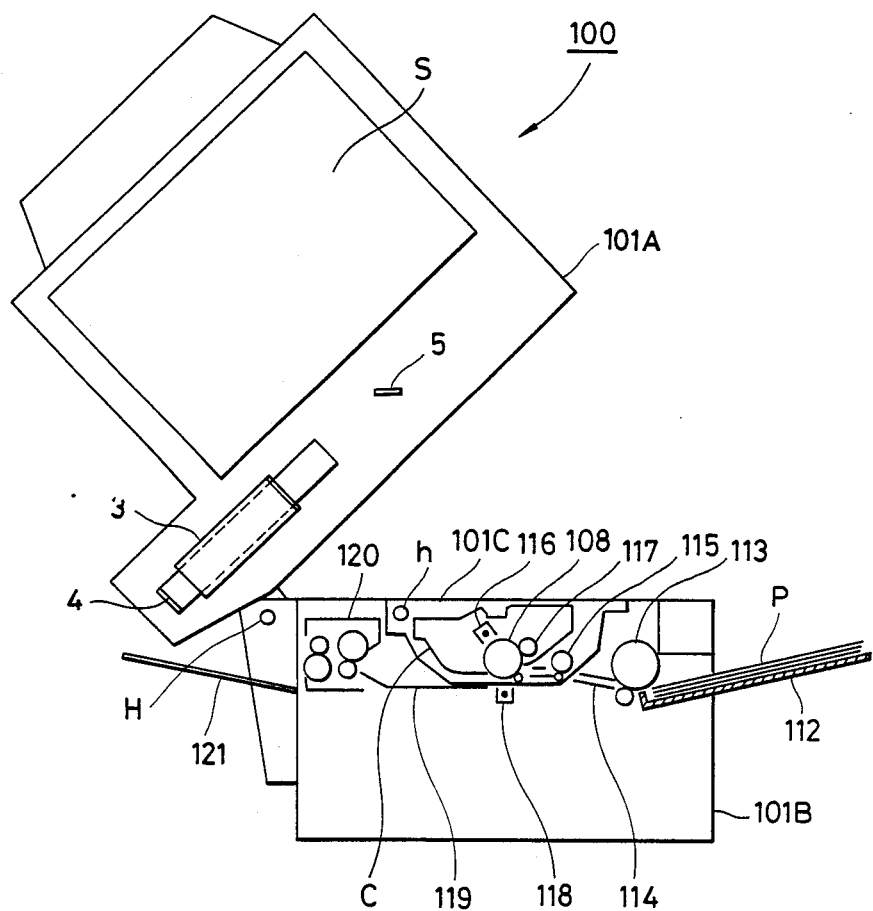
FIG. 6 is a view similar to FIG. 5, in which the middle assembly is shown in its closed position.
Figure 7:
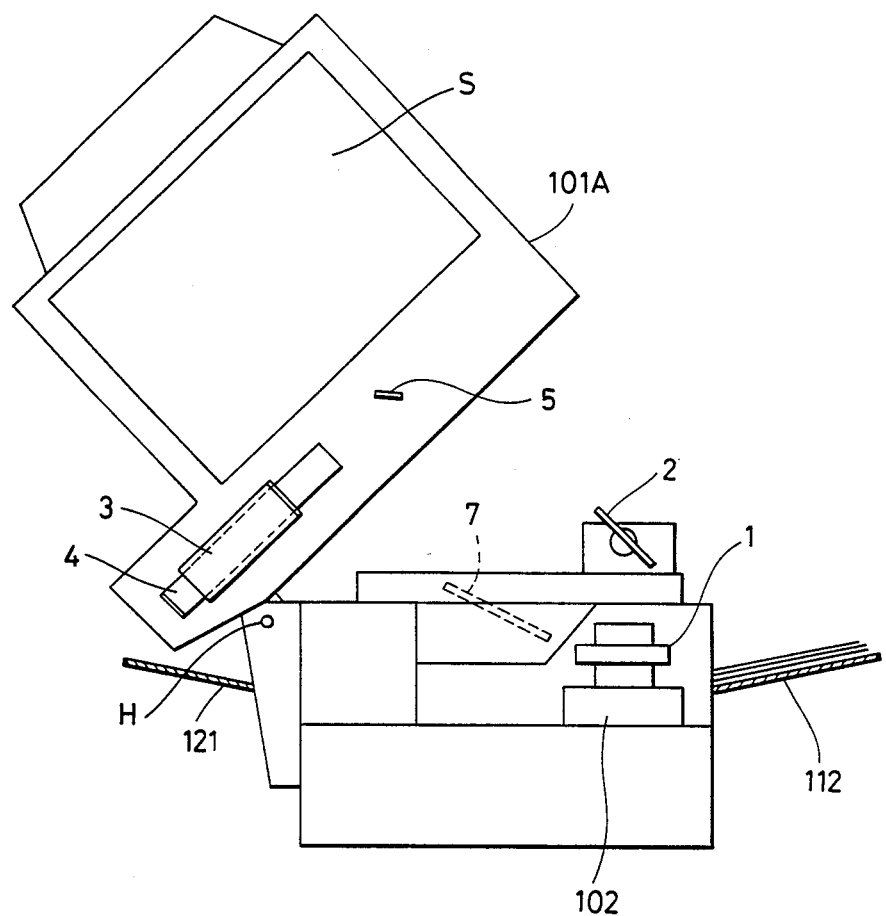
FIG. 7 is a schematic front elevational view of the third embodiment with the upper assembly in the open position, and illustrates the mounting positions of mirrors and associated parts.

FIGS. 5 to 7 are diagrammatic front elevational views of the third embodiment. As described above, the reader printer 100 comprises the upper assembly 101A and the lower assembly 101B, and the upper and lower assemblies 101A and 101B are swingably joined together by the hinge H which is disposed on the left-hand side as viewed from the front side of the reader printer. A hinge portion including the hinge H is detachably mounted to the upper and lower assemblies 101A and 101B by a screw or the like.

In the upper assembly 101A, the screen S and the third and fourth mirrors 8 and 9, both of which constitute the reader optical system, are fixed in corresponding predetermined locations; and the second, third and fourth mirrors 3, 4 and 5 which constitute the printer optical system are also fixed in corresponding predetermined positions. Since the upper and lower assemblies 101A and 101B can be detached from each other, the above-described mirrors of the reader optical system and those of the printer optical system can be assembled as individual units.

As shown in FIG. 7, the film carrier 102, the projection lens 1, the rotary mirror 2 and the second mirror 7, which constitutes a part of the reader system, are fixed in corresponding predetermined positions in the lower assembly 101B.

The lower assembly 101B further includes recording means for recording an image of the microfilm F by a known electrophotographic process, as shown in FIG. 6. More specifically, a sheet feeding tray 112 which carries sheets of recording paper as the transfer material P, and a sheet feeding roller 113, for feeding the recording paper or transfer material P through a guide 114, are disposed on the right-hand side of the reader printer as viewed from the front side thereof. A registration roller 115 for feeding the recording paper P at predetermined timings and the above-described photosensitive drum 108 are disposed in approximately the middle of a rear portion of the lower assembly 101B. A primary electrostatic charger 116, a development device 117 and a transfer charger 118 are all disposed around the photosensitive drum 108. On the left-hand side of the lower assembly 101B, are disposed a feed guide 119 for guiding the recording paper P after development, a fixing device 120 for fixing a developed image on the recording paper P, and a discharge tray 121 for carrying discharged sheets of the recording paper P.

In the third embodiment, in order to facilitate maintenance and to improve the efficiency of assembly, the photosensitive drum 108, the primary electrostatic charger 116 and the development device 117 are assembled as a unit, and are mounted in a cartridge C which constitutes a part of the image forming section.

As shown in FIG. 5, a middle assembly 101C is mounted to the lower assembly 101B for pivotal movement about a hinge h so that the cartridge C can be detached from the lower assembly 101B easily and within a limited space. The cartridge C detachably engages with the middle assembly 101C, and the above-described registration roller 115 is also incorporated in the middle assembly 101C.

In the third embodiment having the above-described arrangement, checking or maintenance, such as elimination of a jammed sheet or cleaning of the interior of the apparatus is performed in the following manner. First, the upper assembly 101A is rotated in the direction indicated by an arrow A by moving a grip (not shown) on the upper assembly 101A to place it in the open position shown in FIG. 5. As described above, the upper assembly 101A is provided with the screen S and the mirrors 3, 4, 5, 8 and 9, while the lower assembly 101B is provided with the image forming cartridge C having the photosensitive drum 108 and its associated components and the rotary mirror 2 with a drive mechanism. Therefore, an operator can open and close the upper assembly 101A by application of a small force. Since the rotary mirror 2 which requires precise movement is mounted in the lower assembly 101B, the rotary mirror 2 is not subjected to substantial shock even when the upper assembly 101A is opened or closed, and therefore the deviation of the optical axis of the rotary mirror 2 can be prevented. In addition, since the projection lens 1 and the mirror 7 are integrally mounted in the lower assembly 101B, it is possible to prevent deviation of the positional relationship between the mirrors 2 and 7 in the vicinity of the projection lens 1 and thereby to minimize the deviation of the optical axis of the image rays.

The rotary mirror 2 and the cartridge C, which require electrical wiring, are disposed in the lower assembly 101B so that no wiring is needed between the upper and lower assemblies 101A and 101B. Accordingly, it is not necessary to treat any wiring at the time of opening or closing of the upper assembly 101A, and the upper and lower assemblies 101A and 101B can be assembled as completely separate units. As described previously, since the upper and lower assemblies 101A and 101B can be detached from each other, it is possible to easily perform maintenance procedures on the interior of the lower assembly 101B, while the upper assembly 101A is disengaged from the lower assembly 101B.

If it should become necessary to eliminate a sheet jammed in the guide 114 or in a sheet feed passage 119, the middle assembly 101C may be rotated about the hinge h in the direction indicated by the arrow A, where it is held in a predetermined position. Since the sheet feed passage 119 is adapted to appear when the middle assembly 101C is set in the predetermined position, it is possible to easily eliminate a jammed sheet. In addition, cleaning of the transfer charger 118 also can be readily carried out in a similar manner.

In the third embodiment, the upper assembly 101A and the middle assembly 101C are arranged to be separately opened and closed. However, the upper and middle assemblies 101A and 101C are interlockingly linked by an arbitrary linkage member (not shown) so that the assemblies 101A and 101C can be opened and closed at the same time. If the upper and middle assemblies 101A and 101C are disengageably linked by the linkage member, it is possible to open and close only the middle assembly 101C, independently of the upper assembly 101A.

The components incorporated in the cartridge C are not confined solely to the above-described components of the third embodiment. For example, a combination of the photosensitive drum 108 and one of the primary electrostatic charger 116, the development device 117 and the cleaner (not shown) may be incorporated in the cartridge C.

In accordance with the present invention, a reader printer having the above-described construction and effects can be designed in such a manner that the upper assembly includes the screen, the reader optical system and the printer optical system, while the remaining components are incorporated in the lower assembly. Therefore, an operator can open and close the upper assembly with no difficulty for checking or maintenance of the interior of the reader printer. In addition, since the rotary mirror, which requires precise movement, is mounted in the lower assembly in order to prevent the rotary mirror from being exposed to shock when the upper assembly is opened or closed, it is possible to prevent the deviation of the optical axes of the rotary mirror.

In the third embodiment, the rotary mirror and the image forming section, which require electrical wiring, are incorporated in the lower assembly so that no wiring is needed between the upper and lower assemblies. Accordingly, it is not necessary to connect or disconnect any wiring at the time of opening or closing of the upper assembly. Also, the upper and lower assemblies can be assembled as completely separate units.

As described above, since the upper and lower assemblies can be detached from each other, it is possible to easily carry out maintenance of the interior of the lower assembly with the upper assembly disengaged from the lower assembly.

Furthermore, since the image forming section can be opened and closed with respect to the sheet feeding section of the lower assembly, it is possible to easily eliminate a sheet jammed in the sheet feeding section.

What is claimed is:

1. An image recording apparatus comprising:
   a projection lens;
   first reflection means rotatably disposed for reflecting light rays transmitted through said projection lens;
   second reflection means for transmitting light rays reflected from said first reflection means onto an image display section; and
   third reflection means for transmitting light rays reflected from said first reflection means onto an image recording section, said third reflection means including a plurality of mirrors, arranged to reflect light from said first reflection means successively from mirror to mirror and then to said image recording section, said plurality of mirrors being further arranged such that the optical axes of light rays reflected to each of said mirrors are located in substantially the same plane.

2. An image recording apparatus according to claim 1, wherein said first reflection means moves pivotally between a display position, at which said first reflection means reflects said light rays to said second reflection means, and a recording position, at which said first reflection means reflects said light rays to said third reflection means, said first reflection means being rotatable at said recording position at a constant speed so as to effect scanning exposure.

3. An image recording apparatus according to claim 2, wherein said second reflection means includes at least two mirrors, said two mirrors being opposed each other across the optical path of light rays which are reflected by said first reflection means at said recording position.

4. An image recording apparatus according to claim 3, wherein said display section includes a screen.

5. An image recording apparatus according to claim 1, further comprising:
   a first assembly including said projection lens, said first reflection means and said image recording section; and
   a second assembly including said display section and said third reflection means, said second assembly being swingably supported on said first assembly.

6. An image recording apparatus according to claim 5, wherein said image recording section includes a photosensitive member and processing means for processing said photosensitive member, said photosensitive member and said processing means being disposed in a third assembly which is swingably supported on said first assembly.

7. An image recording apparatus according to claim 5, wherein said photosensitive member and said processing means are detachable from said third assembly.

8. An image recording apparatus according to claim 6, wherein said second assembly and said third assembly are swingable in the same direction.

9. An image recording apparatus according to claim 1, wherein said first reflection means and said third reflection means are disposed in substantially the same plane, said display section being disposed on one side of said plane, said projection lens and said recording section being disposed on the opposite side of said plane.

10. A reader printer which is arranged to project an image from a film onto a screen and, as required, to project said image onto a photosensitive member, said reader printer comprising:
    a first assembly including a projection lens and a rotary mirror;
    a second assembly including a plurality of mirrors arranged to transmit light rays reflected by said rotary mirror onto said screen and said photosensitive member, said second assembly being supported on said first assembly to swing between closed and open positions; and
    a third assembly including said photosensitive member and processing means arranged to cooperate with said photosensitive member to record and reproduce images projected onto said photosensitive member, said third assembly being rotatably supported on said first assembly and being detachable from said first assembly when said second assembly is placed in its open position.

11. A reader printer according to claim 10, wherein said photosensitive member and said processing means are detachable as a unit from said third assembly.

12. A reader printer according to claim 11, wherein said processing means includes means for electrostatically charging said photosensitive member and means for developing an electrostatic latent image formed on said photosensitive member.

13. In an image recording apparatus which is arranged to project image rays from an image bearing medium onto a screen by the mirrors of a reader system and, as required, to record said image on an image recording medium by rotating a rotary mirror in a scanning manner, a plurality of reflection mirrors arranged to transmit image rays reflected by said rotary mirror successively from mirror to mirror and then onto said image recording medium, said mirrors being disposed such that the optical axes of the image rays reflected from said rotary mirror to the last of said reflection mirrors are may be located in the same plane.

* * * * *

UNITED STATES PATENT AND TRADEMARK OFFICE
CERTIFICATE OF CORRECTION

PATENT NO. : 4,881,099

DATED : November 14, 1989

INVENTOR(S) : Onuki, et al.

It is certified that error appears in the above-identified patent and that said Letters Patent is hereby corrected as shown below:

COLUMN 1

Line 16, "dispose" should read --disposed--.
Line 58, "is" should read --are--.
Line 64, "includes" should read --include--.

COLUMN 2

Line 16, "can" should read --which can--.
Line 18, "includes," should be deleted.

COLUMN 5

Line 31, "arrow $X_2$" should read --arrow $X_2$.--.

COLUMN 6

Line 2, "a" (first occurrence) should read --and--.

UNITED STATES PATENT AND TRADEMARK OFFICE
CERTIFICATE OF CORRECTION

PATENT NO. : 4,881,099

DATED : November 14, 1989

INVENTOR(S) : Onuki, et al.

It is certified that error appears in the above-identified patent and that said Letters Patent is hereby corrected as shown below:

COLUMN 10

Line 17, "each" should read --to each--.

COLUMN 12

Line 10, "are may be" should read --are--.

Signed and Sealed this

Second Day of July, 1991

Attest:

HARRY F. MANBECK, JR.

*Attesting Officer*     Commissioner of Patents and Trademarks